United States Patent
Ding et al.

(10) Patent No.: US 11,361,909 B2
(45) Date of Patent: Jun. 14, 2022

(54) ULTRALOW-TEMPERATURE AND HIGH-CAPACITY SUPERCAPACITOR AND PREPARATION METHOD THEREFOR

(71) Applicants: JIANGSU UNIVERSITY, Jiangsu (CN); CHANGZHOU UNIVERSITY, Jiangsu (CN)

(72) Inventors: Jianning Ding, Jiangsu (CN); Jiang Xu, Jiangsu (CN); Ningyi Yuan, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 16/639,854

(22) PCT Filed: Dec. 29, 2018

(86) PCT No.: PCT/CN2018/125428
§ 371 (c)(1),
(2) Date: Oct. 26, 2020

(87) PCT Pub. No.: WO2019/223317
PCT Pub. Date: Nov. 28, 2019

(65) Prior Publication Data
US 2021/0057170 A1     Feb. 25, 2021

(30) Foreign Application Priority Data
May 25, 2018   (CN) .......................... 201810512691.1

(51) Int. Cl.
*H01G 11/24*     (2013.01)
*H01G 11/60*     (2013.01)
(Continued)

(52) U.S. Cl.
CPC ............. *H01G 11/24* (2013.01); *H01G 11/34* (2013.01); *H01G 11/60* (2013.01); *H01G 11/86* (2013.01)

(58) Field of Classification Search
None
See application file for complete search history.

(56) References Cited

U.S. PATENT DOCUMENTS

| 8,081,418 B2 | 12/2011 | Brandon et al. |
| 8,911,510 B2 * | 12/2014 | Leis ....................... H01G 11/14 29/25.03 |

(Continued)

FOREIGN PATENT DOCUMENTS

| CN | 101911229 A | 12/2010 |
| CN | 104576081 A | 4/2015 |

(Continued)

OTHER PUBLICATIONS

International Search Report for PCT Application No. PCT/CN2018/125428; State Intellectual Property Office of P.R. China; Beijing, China; dated Apr. 1, 2019.

(Continued)

*Primary Examiner* — Dion R. Ferguson
(74) *Attorney, Agent, or Firm* — Thomas E. Lees, LLC

(57) ABSTRACT

Disclosed are an ultra-low temperature and high-capacity supercapacitor and a preparation method thereof. The electrode material used in the ultra-low temperature and high capacity supercapacitor is a composite porous carbon material comprising micropores and mesopores, the specific surface area of the electrode material is greater than 2500 $m^2/g$, the pore size of micropores is larger than 0.8 nm, the pore size of mesopores is 2-3.0 nm, and the proportion of micropores is greater than 70%. The electrolyte of the supercapacitor is a solution of spirocyclic quaternary ammonium tetrafluoroborate in a mixed solvent of 1,3-dioxolane (or methyl formate, or a mixture of both)/acetonitrile. Based on the above electrode materials and combined with the above electrolyte, the supercapacitors as prepared can have a mass specific capacitance of greater than 150 F/g and a (Continued)

volume specific capacitance of greater than 80 F/cm$^3$, under a temperature of −100° C. and at a current density of greater than 1 A/g.

6 Claims, 1 Drawing Sheet

(51) Int. Cl.
*H01G 11/34* (2013.01)
*H01G 11/86* (2013.01)

(56) References Cited

U.S. PATENT DOCUMENTS

| | | | | |
|---|---|---|---|---|
| 9,263,197 B2* | 2/2016 | Gadkaree | ............... | H01G 9/035 |
| 2002/0097549 A1* | 7/2002 | Maletin | ................ | H01G 11/24 |
| | | | | 361/502 |
| 2011/0170237 A1* | 7/2011 | Brandon | ............... | H01G 11/58 |
| | | | | 361/502 |
| 2012/0126231 A1* | 5/2012 | Momo | .................... | H02S 40/38 |
| | | | | 257/53 |
| 2013/0209871 A1* | 8/2013 | Kato | .................. | C01G 45/1228 |
| | | | | 429/199 |
| 2014/0098463 A1* | 4/2014 | Bendale | ................ | H01G 11/54 |
| | | | | 361/502 |
| 2015/0024267 A1* | 1/2015 | Jung | ................... | H01M 10/052 |
| | | | | 429/200 |
| 2015/0072238 A1* | 3/2015 | Woo | ...................... | H01M 4/366 |
| | | | | 429/219 |
| 2015/0357127 A1* | 12/2015 | Horii | ...................... | H01G 11/28 |
| | | | | 361/502 |
| 2016/0093449 A1* | 3/2016 | Yoon | ...................... | H01G 11/44 |
| | | | | 361/502 |
| 2016/0122185 A1* | 5/2016 | Feaver | .................... | H01G 11/34 |
| | | | | 429/405 |
| 2017/0338061 A1 | 11/2017 | Knopsnyder et al. | | |
| 2019/0341202 A1* | 11/2019 | Nishita | .................. | H01G 11/34 |

FOREIGN PATENT DOCUMENTS

| | | |
|---|---|---|
| CN | 104685591 A | 6/2015 |
| CN | 104760948 A | 7/2015 |
| CN | 104779075 A | 7/2015 |
| CN | 105247640 A | 1/2016 |
| CN | 107204466 A | 9/2017 |
| CN | 108766775 A | 11/2018 |

OTHER PUBLICATIONS

Written Opinion of the International Searching Authority for PCT/CN2018/125428; State Intellectual Property Office of P.R. China; Beijing, China; dated Apr. 1, 2019.

Zuo, Fei-long et al.; "Investigation of Low Temperature Organic Electrolytes for Supercapacitors"; Chinese Journal of Power Sources; vol. 40, No. 10; Oct. 31, 2016; pp. 2023-2025; English Abstract.

English Translation of the Written Opinion of the International Searching Authority for PCT/CN2018/125428; State Intellectual Property Office of P.R. China; Beijing, China; dated Apr. 1, 2019.

* cited by examiner

ULTRALOW-TEMPERATURE AND HIGH-CAPACITY SUPERCAPACITOR AND PREPARATION METHOD THEREFOR

CROSS-REFERENCE TO RELATED APPLICATIONS

This application is a national stage entry under 35 USC § 371(b) of PCT International Application No. PCT/CN2018/125428, filed on Dec. 29, 2018, and claims the benefit of Chinese Patent No. 201810512691.1, filed on May 25, 2018, which are expressly incorporated by reference herein.

TECHNICAL FIELD

The invention pertains to the technical field of supercapacity, and particularly relates to a supercapacitor capable of ensuring superior performance in an ultra-low temperature environment and a preparation method thereof.

BACKGROUND

For low temperature working environments, such as high altitude, extremely cold areas, aerospace and other fields, there are higher requirements on energy storage devices. Lithium ion batteries generally have very high energy storage capacity. However, as operating temperature decreases, the conductivity of electrolyte severely reduces, greatly increasing the resistance of ions through the solid electrolytic interface. This limits the operating temperature of the lithium ion batteries. Generally, the lowest temperature at which lithium ion batteries can work normally is −20° C. Compared to lithium ion batteries, supercapacitors can have operating temperatures which are somewhat lower but still limited. In the cases of using conventional acetonitrile (ACN) solvent and propylene carbonate (PC) solvent, the operating temperature can be as low as −45° C. and −25° C., respectively. Modification of the electrolyte (such as mixed solvents, adding different salts in the solvent) mainly lowers the freezing point of the solvent, thereby alleviating the sharp decrease in conductivity due to temperature drop. For example, compared to capacitors using pure ACN solvent, capacitors using an 1:1 mixed solvent of ACN/1,3-dioxane (DIOX) can operate at temperatures as low as −70° C. Even so, at lower temperatures, the capacitance and rate capability of capacitors are much lower than those at room temperature. For carbon materials, although carbon nanotubes or carbon onions as active materials can greatly improve the performance of supercapacitors at low temperatures, their mass specific capacitances and volume capacitances are too low to be used for commercial purposes.

BRIEF SUMMARY

The technical problem to be solved by the present invention is to overcome the technical problem that the supercapacitor in the prior art has poor charge and discharge performance under ultra-low temperature environment.

The technical solution of the present invention for solving the technical problem is to provide an ultra-low temperature high-capacity supercapacitor, in which a composite porous carbon material comprising micropores and mesopores is used as an electrode material, and a solution of spirocyclic quaternary ammonium tetrafluoroborate (SBP—$BF_4$) in a mixed solvent is used as an electrolyte, wherein the specific surface area of the composite porous carbon material is greater than 2500 $m^2/g$, the pore size of micropores is larger than 0.8 nm, the pore size of mesopores is 2-3.0 nm, and the proportion of micropores is greater than 70%. The capacitor has a mass specific capacitance of greater than 150 F/g and a volume specific capacitance of greater than 80 $F/cm^3$, under a temperature of −100° C. and at a current density of greater than 1 A/g.

The method for preparing the porous carbon material comprises:

placing dried biomass carbon in a tube furnace; heating it in the presence of argon to 400-500° C. with a heating rate of ≥100° C./min and then keeping the temperature for half an hour for rapid carbonization; after the tube furnace is cooled to room temperature, taking out the carbonized product; mixing the product with potassium hydroxide and grinding in a mortar for 20 min until the carbon material and potassium hydroxide are mixed uniformly; placing the mixed material in a tube furnace, and activating it at 800° C. in the presence of argon; after the tube furnace is cooled to room temperature, taking out the activated product; washing the activated product with hydrochloric acid, and then washing with water to neutrality, thereby obtaining the composite porous carbon, wherein the mass ratio of the carbonized product to KOH is 1:3.

The mixed solvent is 1,3-dioxolane/acetonitrile, methyl formate/acetonitrile, or a mixture of 1,3-dioxolane and methyl formate/acetonitrile; wherein a volume ratio of 1,3-dioxolane, methyl formate or a mixture of 1,3-dioxolane and methyl formate to acetonitrile is greater than 2.

The specific size of the micropores relieves the restriction on desolvation of solvated ions at low temperature, and the specific size of the mesopores ensures a fast transmission channel of ions in the porous carbon. The ratio of micropores to mesopores as well as the specific surface area of porous carbon ensure the high capacity of the capacitor, and at the same time, the balance between ion transport in the electrolyte and the ion adsorption rate on the surface of the porous carbon is taken into account. Further, combined with the electrolyte which is a solution of spiro quaternary ammonium tetrafluoroborate (SBP—$BF_4$) in the mixed solvent, a high-performance supercapacitor capable of working at −100° C. is realized.

The invention also provides a method for preparing an ultra-low temperature and high-capacity supercapacitor. The specific process steps include:

S1: Preparation of supercapacitor electrode sheet: The composite porous carbon material is mixed and ground with a conductive agent and a binder in a mortar for 20 minutes until the materials are uniformly mixed, and an appropriate amount of solvent is added with continue grinding to ensure that the slurry is uniformly mixed and the slurry can be coated but not self-casting; the slurry is coated on a carbon-coated aluminum foil by a doctor blade to make an electrode sheet.

S2: Preparation of electrolyte: A mixed solvent of 1,3-dioxolane/acetonitrile, of methyl formate/acetonitrile, or of a mixture of 1,3-dioxolane and methyl formate/acetonitrile is used to dissolve SBP—$BF_4$ salt so as to form an electrolyte; wherein the volume ratio of 1,3-dioxolane, methyl formate or a mixture of 1,3-dioxolane and methyl formate to acetonitrile is greater than 2, and the concentration of SBP—$BF_4$ salt is 0.2-0.5 mol/L.

S3 Assembly of supercapacitor: The electrode sheet is dried, and then quickly transferred to a glove box to assemble CR2025 button cell therein. After the battery is assembled, the battery is allowed to stand for a period of time for formation (pre-formation), so as to be ready for subsequent testing.

As a preference of the present invention, the conductive agent in step S1 is conductive carbon black (Super-P), the binder is sodium carboxymethyl cellulose (CMC), and the solvent is deionized water; wherein a mass ratio of the composite porous carbon material, the conductive agent and the binder is 8-23:1:1.

As a preference of the present invention, in step S3, the electrode sheet is dried in a vacuum drying box at 120° C. for 12 h. After the battery is assembled, the formation time is 12 h.

Performance test of supercapacitor: The supercapacitor obtained in step S3 is subjected to a charge and discharge test at a low temperature.

The invention also provides the use of ultra-low temperature and high capacity supercapacitor in the fields of high altitude, deep sea, aviation, aerospace and military applications. Based on composite porous carbon materials, supercapacitors assembled with new electrolyte can have outstanding electrochemical performance in special fields such as high altitude, deep sea, aviation, aerospace and military applications, and solve the problem of energy storage under ultra-low temperature.

The beneficial effects of the present invention include:

(1) As a new type of energy storage device, the supercapacitors are more environmentally friendly than fossil fuels;

(2) The carbon materials are rich in sources, low in price, and the entire assembly process of the supercapacitors is simple, which can meet the requirements of industrial production;

(3) The supercapacitors have excellent charge and discharge performance under ultra-low temperature conditions, and solve the energy storage problem under extreme conditions.

In order to make the foregoing objects, features, and advantages of the present invention more comprehensible, the present invention is described in detail with specific embodiments as follows.

DETAILED DESCRIPTION

Figure 1:
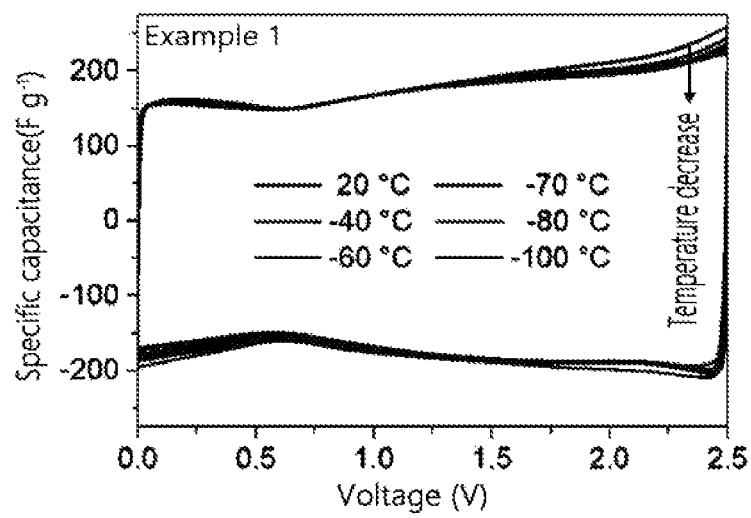
FIG. 1 shows cyclic voltammetry curves of the capacitor prepared in Example 1 at different temperatures.

As used herein, "one example" or "an example" refers to particular feature(s), structure(s), or characteristic(s) that can be included in at least one embodiment of the present invention. The appearances of "in one example" in various places in this specification do not all refer to the same example, nor are they separate or selectively exclusive examples.

A method for preparing an ultra-low temperature and high-capacity supercapacitor according to the present invention includes the following steps:

Step 1: Preparation of supercapacitor electrode sheet: A carbon material, a conductive agent, and a binder are mixed and ground in a mortar for 20 minutes until the materials are uniformly mixed, and an appropriate amount of solvent is added with continue grinding to ensure that the slurry is uniformly mixed and the slurry can be coated but not self-casting. The slurry is coated on a carbon-coated aluminum foil by a doctor blade to prepare an electrode sheet.

Specifically, it is required that the carbon material used is a microporous or micro-/mesoporous composite porous carbon material with a specific surface area greater than 2500 $m^2/g$, wherein the pore size of micropores is greater than 0.8 nm, the pore size of mesopores is 2.0-3.0 nm, and the proportion of micropores is greater than 70%. The conductive agent is Super-P, the binder is CMC, and the solvent is deionized water.

Step 2: Preparation of electrolyte: A mixed solvent of 1,3-dioxolane (or methyl formate (MF), or a mixture of both)/acetonitrile is used to dissolve SBP—$BF_4$ salt so as to form an electrolyte.

Specifically, in the solvent selection, the volume ratio of 1,3-dioxolane (or MF, or a mixture of both) to acetonitrile is greater than 2. The concentration of SBP—$BF_4$ salt is 0.2-0.5 mol/L.

Step 3: Assembly of supercapacitor: The electrode sheet is dried, and then quickly transferred to a glove box to assemble CR2025 button cell. After the battery is assembled, the battery is allowed to stand for a period of time for formation (pre-formation), so as to be ready for subsequent testing.

Specifically, the electrode sheet is dried in a vacuum drying box at 120° C. for 12 h. After the battery is assembled, the formation time is 12 h.

Step 4: Performance test of supercapacitor: The supercapacitor obtained in step 3 is subjected to a charge and discharge test at a low temperature.

The following describes three embodiments that can fully reflect the content of the present invention in combination with a method for preparing an ultra-low temperature and high capacity supercapacitor.

Example 1

Preparation of Composite Porous Carbon

Dried biomass carbon was placed in a tube furnace and then heated in the presence of argon to 400° C. with a heating rate of 100° C./minute and the temperature was kept for half an hour for rapid carbonization. When the tube furnace was cooled to room temperature, the carbonized product was removed. The product was mixed with potassium hydroxide, and ground in a mortar for 20 min until the carbon material and potassium hydroxide were mixed uniformly. The mixed material was placed in a tube furnace and was activated at 800° C. in the presence of argon. After the tube furnace was cooled to room temperature, the activated product was taken out and washed with hydrochloric acid, and then washed with water to neutrality to obtain a composite porous carbon, wherein the mass ratio of the carbonized product to KOH was 1:3.

Preparation of Supercapacitor

Step 1: Preparation of supercapacitor electrode sheet: The obtained porous carbon material with a specific surface area of greater than 2500 $m^2/g$, pore size of micropores of greater than 0.8 nm, pore size of mesopores of 2-3.0 nm, and micropore proportion of greater than 70%, was mixed with Super-P as a conductive agent and CMC as a binder in a ratio of 92:4:4, and ground in a mortar for 20 minutes until the materials were uniformly mixed, and then an appropriate amount of deionized water was added with continue grinding to ensure uniformly mixing of slurry and the slurry capable of being coated but not self-casting. The slurry was coated on a carbon-coated aluminum foil by a doctor blade to prepare an electrode sheet.

Step 2: Preparation of electrolyte: A mixed solvent of 1,3-dioxolane and acetonitrile in a volume ratio of 3:1 was selected as a solvent to dissolve SBP—BF$_4$ salt, the concentration of the SBP—BF$_4$ salt being 0.2 mol/L.

Step 3: Assembly of supercapacitor: The electrode sheet was dried in a vacuum drying box at 120° C. for 12 hours and then quickly transferred to a glove box to assemble a CR2025 button cell. After the battery was assembled, it was left to stand for 12 hours for formation, so as to be ready for subsequent testing.

Step 4: Performance test of supercapacitor: The supercapacitor obtained in step 3 was subjected to charge and discharge test at −100° C. under a current density of 1.5 A/g, and the mass specific volume and volume specific capacitance of the supercapacitor were calculated.

The supercapacitor based on the above electrode material combined with the novel electrolyte had a mass specific capacitance >150 F/g and a volume specific capacitance >80 F/cm$^3$, when being under a temperature of −100° C. and at a current density >1 A/g.

Figure 2:
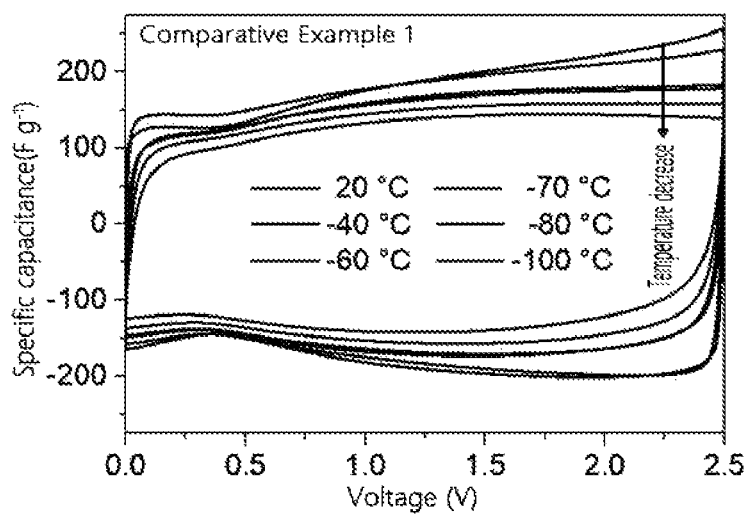
FIG. 2 shows cyclic voltammetry curves of the capacitor prepared in Comparative Example 1 at different temperatures.

FIG. 1 shows the cyclic voltammetry curves of the capacitor made in Example 1 at different temperatures; FIG. 2 shows the cyclic voltammetry curves of the capacitor made in Comparative Example 1 at different temperatures.

As seen from the figures, in Example 1, the capacitance value of the system changed slightly with the decrease in temperature, while in Comparative Example 1 described below, the capacitance value decreased sharply with the decrease in temperature.

Example 2

The composite porous carbon was prepared in the same manner as in Example 1.

Preparation of Supercapacitor

Step 1: Preparation of supercapacitor electrode sheet: The porous carbon material with a specific surface area of greater than 2500 m$^2$/g, pore size of micropores of greater than 0.8 nm, pore size of mesopores of 2.0-3.0 nm, and micropore proportion of greater than 70%, was mixed with Super-P as a conductive agent and CMC as a binder in a ratio of 90:5:5, and ground in a mortar for 20 minutes until the materials were uniformly mixed, and then an appropriate amount of deionized water was added with continue grinding to ensure uniformly mixing of slurry and the slurry capable of being coated but not self-casting. The slurry was coated on a carbon-coated aluminum foil by a doctor blade to prepare an electrode sheet.

Step 2: Preparation of electrolyte: A mixed solvent of MF and acetonitrile in a volume ratio of 3:1 was selected as a solvent to dissolve SBP—BF$_4$ salt, the concentration of the SBP—BF$_4$ salt being 0.3 mol/L.

Step 3: Assembly of supercapacitor: The electrode sheet was dried in a vacuum drying box at 120° C. for 12 hours and then quickly transferred to a glove box to assemble a CR2025 button cell. After the battery was assembled, it was left to stand for 12 hours for formation, so as to be ready for subsequent testing.

Step 4: Performance test of supercapacitor: The supercapacitor obtained in step 3 was subjected to charge and discharge test under a temperature of −100° C. and at a current density of 2 A/g, and the mass specific volume and volume specific capacitance of the supercapacitor were calculated.

The supercapacitor based on the above electrode material combined with the novel electrolyte had a mass specific capacitance >150 F/g and a volume specific capacitance >80 F/cm$^3$, when being under a temperature of −100° C. and at a current density >1 A/g.

Example 3

The composite porous carbon was prepared in the same manner as in Example 1.

Preparation of Supercapacitor

Step 1: Preparation of supercapacitor electrode sheet: The porous carbon material with a specific surface area of greater than 2500 m$^2$/g, pore size of micropores of greater than 0.8 nm, pore size of mesopores of 2.0-3.0 nm, and micropore proportion of greater than 70%, was mixed with Super-P as a conductive agent and CMC as a binder in a ratio of 8:1:1, and ground in a mortar for 20 minutes until the materials were uniformly mixed, and then an appropriate amount of deionized water was added with continue grinding to ensure uniformly mixing of slurry and the slurry capable of being coated but not self-casting. The slurry was coated on a carbon-coated aluminum foil by a doctor blade to prepare an electrode sheet.

Step 2: Preparation of electrolyte: A mixed solution of 1,3-dioxolane and MF each accounting for 50% was prepared firstly, and then the solution was mixed with acetonitrile in a volume ratio of 3:1 to form a mixed solvent to dissolve SBP—BF$_4$ salt, the concentration of the SBP—BF$_4$ salt being 0.5 mol/L.

Step 3: Assembly of supercapacitor: The electrode sheet was dried in a vacuum drying box at 120° C. for 12 hours and then quickly transferred to a glove box to assemble a CR2025 button cell. After the battery was assembled, it was left to stand for 12 hours for formation, so as to be ready for subsequent testing.

Step 4: Performance test of supercapacitor: The supercapacitor obtained in step 3 was subjected to charge and discharge test at −100° C. under a current density of 2 A/g, and the mass specific volume and volume specific capacitance of the supercapacitor were calculated.

The supercapacitor based on the above electrode materials combined with the novel electrolyte had a mass specific capacitance >150 F/g and a volume specific capacitance >80 F/cm$^3$, when being under a temperature of −100° C. and at a current density >1 A/g.

Comparative Example 1

Preparation of Supercapacitor

Step 1: Preparation of supercapacitor electrode sheet: Commercial available active carbon material was mixed with Super-P as a conductive agent and CMC as a binder in a ratio of 92:4:4, and ground in a mortar for 20 minutes until the materials were uniformly mixed, and then an appropriate amount of deionized water was added with continue grinding to ensure uniformly mixing of slurry and the slurry capable of being coated but not self-casting. The slurry was coated on a carbon-coated aluminum foil by a doctor blade to prepare an electrode sheet.

Other steps were the same as in Example 1.

The supercapacitor based on the above electrode material combined with the novel electrolyte had a mass specific capacitance >85 F/g and a volume specific capacitance >47 F/cm$^3$, when being under a temperature of −100° C. and at a current density >1 A/g.

Because the common carbon material has a large number of micropores with a pore diameter being less than 0.8 nm, when it is used as an electrode material, the performance of the capacitor is affected by ion desolvation at low temperature. The lower the temperature, the more difficult the desolvation and the worse the performance are.

Comparative Example 2

Preparation of Supercapacitor

Step 2: Preparation of electrolyte: 1,3-dioxolane or MF was selected as the solvent to dissolve SBP—$BF_4$ salt, the concentration of the SBP—$BF_4$ salt being 0.2 mol/L.

Other steps are the same as in Example 1.

The supercapacitor based on the above electrode material combined with the electrolyte had a mass specific capacitance of 135 F/g and a volume specific capacitance of >71 $F/cm^3$ when being under a temperature of −100° C. and at a current density of >1 A/g.

Because 1,3-dioxolane or MF has a large viscosity, when one of them is used as a single solvent, the viscosity of the electrolyte increases and the low-temperature performance decreases.

Comparative Example 3

Step 2: Preparation of electrolyte: ACN was selected as the solvent to dissolve SBP—BF4 salt, the concentration of the SBP—BF4 salt being 0.2 mol/L.

Other steps are the same as in Example 1.

The supercapacitor based on the above electrode material combined with the electrolyte had a mass specific capacitance of >0 F/g and a volume specific capacitance of >0 $F/cm^3$ when being under a temperature of −100° C. and at a current density of >1 A/g.

Taking ACN as a single solvent, its freezing point is −45° C. Below this temperature, the electrolyte gradually solidifies, and normal charge and discharge cannot be achieved.

Comparative Example 4

Preparation of Supercapacitor

Step 2: Preparation of electrolyte: Propylene carbonate (PC) was selected as the solvent to dissolve SBP—$BF_4$ salt, the concentration of the SBP—$BF_4$ salt being 0.2 mol/L.

Other steps are the same as in Example 1.

The supercapacitor based on the above electrode material combined with the electrolyte had a mass specific capacitance of >0 F/g and a volume specific capacitance of >0 $F/cm^3$ at −100° C. under a current density of >1 A/g.

When propylene carbonate (PC) solvent is used to dissolve the electrolyte, its conductivity, viscosity and dielectric constant are not as good as ACN, and the operating temperature cannot be lower than −40° C., so the performance is poor at low temperature.

It should be appreciated by those of ordinary skilled in the art that one of the features or objects of the present invention is that the method for preparing the above ultra-low temperature and high capacity supercapacitor have the following advantages: (1) The supercapacitors as a new type of energy storage device are more environmentally friendly than fossil fuels; (2) the carbon materials are rich in sources, low in price, and the entire assembly process of the supercapacitors is simple, which can meet the requirements of industrial production; (3) the supercapacitors have excellent charge and discharge performance under ultra-low temperature conditions, solving the problem of energy storage under extreme conditions.

In light of the above-mentioned ideal embodiments according to the present invention, with reference to the above-mentioned description content, those skilled in relevant technical field can make various changes and modifications without departing from the technical idea of the present invention. The technical scope of this invention is not limited to the content of the description, and its technical scope should be determined according to the scope of the claims.

What is claimed is:

1. An ultra-low temperature and high-capacity supercapacitor, wherein a composite porous carbon material comprising micropores and mesopores is used as an electrode material, and a solution of spirocyclic quaternary ammonium tetrafluoroborate (SBP—$BF_4$) in a mixed solvent is used as an electrolyte in the supercapacitor, characterized in that the specific surface area of the composite porous carbon material is greater than 2500 $m^2$/g, the pore size of micropores is larger than 0.8 nm, the pore size of mesopores is 2.0-3.0 nm, and the proportion of micropores is greater than 70%, and wherein the supercapacitor has a mass specific capacitance of greater than 150 F/g and a volume specific capacitance of greater than 80 $F/cm^3$, at a temperature of −100° C. and at a current density of greater than 1 A/g, the mixed solvent is 1,3-dioxolane/acetonitrile, methyl formate/acetonitrile, or a mixture of 1,3-dioxolane and methyl formate/acetonitrile, wherein a volume ratio of 1,3-dioxolane, methyl formate or a mixture of 1,3-dioxolane and methyl formate to acetonitrile is greater than 2.

2. The ultra-low temperature and high-capacity supercapacitor according to claim 1, characterized in that the preparation method of the composite porous carbon material comprises:
   placing dried biomass carbon in a tube furnace; heating it in the presence of argon to 400-500° C. with a heating rate of 100° C./min and then keeping the temperature for half an hour for rapid carbonization; after the tube furnace is cooled to room temperature, taking out the carbonized product; mixing the product with potassium hydroxide and grinding in a mortar for 20 min until the carbon material and potassium hydroxide are mixed uniformly; placing the mixed material in a tube furnace, and activating it at 800° C. in the presence of argon; after the tube furnace is cooled to room temperature, taking out the activated product; washing the activated product with hydrochloric acid, and then washing with water to neutrality, thereby obtaining the composite porous carbon, wherein the mass ratio of the carbonized product to KOH is 1:3.

3. A method for preparing the ultra-low temperature and high-capacity supercapacitor according to claim 1, characterized in that the steps of the preparation method are as follows:
   S1 preparation of supercapacitor electrode sheet: the composite porous carbon material is mixed and ground with a conductive agent and a binder in a mortar for 20 minutes until the materials are uniformly mixed, and a solvent is added with continue grinding to ensure that the slurry is uniformly mixed and the slurry can be coated but not self-casting; the slurry is coated on a carbon-coated aluminum foil by a doctor blade to make an electrode sheet;
   S2 preparation of electrolyte: the mixed solvent is used to dissolve SBP—$BF_4$ salt to form an electrolyte;
   S3 assembly of supercapacitor: the electrode sheet is dried, and then quickly transferred to a glove box to assemble a CR2025 button cell; after the battery is assembled, the battery is allowed to stand for a period of time for formation, so as to be ready for subsequent testing.

4. The method for preparing an ultra-low-temperature and high-capacity supercapacitor according to claim 3, characterized in that in step S1, the conductive agent is Super-P, the binder is CMC, and the solvent is deionized water, and a mass ratio of the composite porous carbon material, the conductive agent Super-P and the binder CMC is 8-23:1:1.

5. The method for preparing an ultra-low temperature and high-capacity supercapacitor according to claim 3, characterized in that the concentration of the SBP—$BF_4$ salt in step S2 is 0.2-0.5 mol/L.

6. The method for preparing an ultra-low temperature and high-capacity supercapacitor according to claim 3, characterized in that in step S3, the electrode sheet is dried in a vacuum drying box at 120° C. for 12 hours, and the formation time after the battery is assembled is 12 h.

* * * * *